(12) United States Patent
Naess et al.

(10) Patent No.: US 8,741,032 B2
(45) Date of Patent: *Jun. 3, 2014

(54) SEPARATOR TANK FOR SEPARATING OIL AND GAS FROM WATER

(75) Inventors: Jan Thore Naess, Porsgrunn (NO); Finn Beckmann, Porsgrunn (NO)

(73) Assignee: Schlumberger Norge AS, Stavanger (NO)

( * ) Notice: Subject to any disclaimer, the term of this patent is extended or adjusted under 35 U.S.C. 154(b) by 196 days.

This patent is subject to a terminal disclaimer.

(21) Appl. No.: 13/378,848

(22) PCT Filed: Jun. 17, 2010

(86) PCT No.: PCT/IB2010/001468
§ 371 (c)(1),
(2), (4) Date: Feb. 14, 2012

(87) PCT Pub. No.: WO2010/146451
PCT Pub. Date: Dec. 23, 2010

(65) Prior Publication Data
US 2012/0137888 A1  Jun. 7, 2012

(30) Foreign Application Priority Data

Jun. 17, 2009 (EP) .................................. 09163001

(51) Int. Cl.
*B01D 19/00* (2006.01)

(52) U.S. Cl.
USPC ................................. 96/174; 96/212; 96/215

(58) Field of Classification Search
USPC ............... 96/155, 182, 208, 209, 215; 55/425
See application file for complete search history.

(56) References Cited

U.S. PATENT DOCUMENTS

| 3,457,703 | A |   | 7/1969  | Cheysson |
| 4,391,613 | A |   | 7/1983  | Wilson |
| 4,452,491 | A | * | 6/1984  | Seglin et al. ..................... 299/5 |
| 5,143,611 | A |   | 9/1992  | Pate, Jr. |
| 5,693,225 | A | * | 12/1997 | Lee ........................... 210/512.2 |
| 5,711,374 | A |   | 1/1998  | Kjos |
| 6,531,066 | B1 | * | 3/2003 | Saunders et al. ............. 210/787 |
| 6,776,823 | B2 | * | 8/2004 | Hotta et al. ..................... 96/168 |
| 2007/0277967 | A1 | * | 12/2007 | Oserod ..................... 166/75.12 |
| 2009/0173232 | A1 | * | 7/2009  | Folkvang ........................ 96/183 |

FOREIGN PATENT DOCUMENTS

| GB | 1 505 840 | 3/1978 |
| WO | WO 02/41965 | 5/2002 |
| WO | WO 2007/049245 | 5/2007 |
| WO | WO 2007/049246 | 5/2007 |
| WO | WO 2007/049247 | 5/2007 |
| WO | WO 2013037049 A1 * | 3/2013 |

OTHER PUBLICATIONS

WO 2013037049.*

* cited by examiner

*Primary Examiner* — Duane Smith
*Assistant Examiner* — Phillip Shao
(74) *Attorney, Agent, or Firm* — Baker Hostetler

(57) ABSTRACT

A separator tank (1) for separating oil and gas from water, and comprising an essentially cylindrical vertical tank casing (3) with a plurality of separator tank units (2). The separator tank units (2, 2', 2") are arranged on top of one another within a central area in an inner annular enclosure (4) that divides the separator tank into an annular outer area (5) and the central area. The flow paths of fluids to inlets (7) in the separator tank units (2) and from at least one second outlet (9) in the separator tank units are arranged at least in the annular outer area.

24 Claims, 4 Drawing Sheets

SEPARATOR TANK FOR SEPARATING OIL AND GAS FROM WATER

Figure 1:
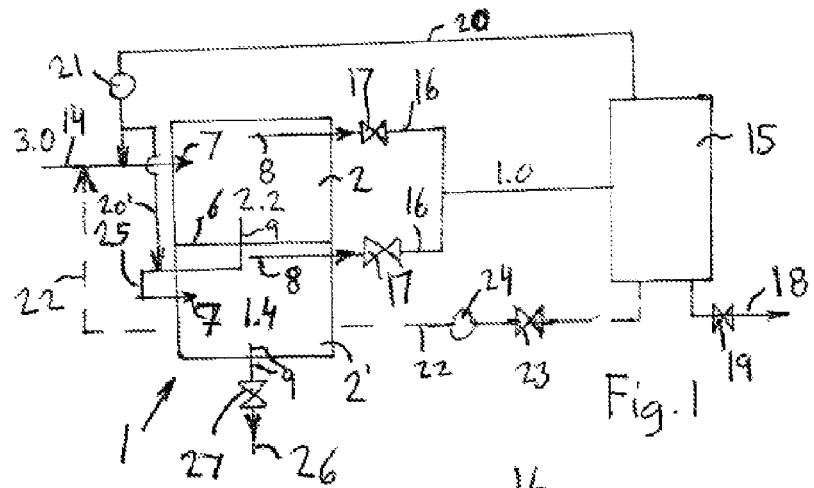

This is a national stage of PCT/IB10/001468 filed Jun. 17, 2010 and published in English, which claims the priority of European number 09163001.2 filed Jun. 17, 2009, hereby incorporated by reference.

The present invention relates to a separator tank for separating oil and gas from water, and comprising an essentially cylindrical vertical tank casing with a separator tank unit, which separator tank unit has an upper part and a lower part, an inlet for fluid, an inner annular wall, at least one first outlet in the upper part of the separator tank unit, and at least one second outlet in the lower part of the separator tank unit; said inner annular wall having a first opening at an upper end of said inner annular wall allowing communication between the upper part and the lower part of the separator tank unit.

A separator tank of this kind is known from WO 02/41965 where the inner annular wall in the single separator tank unit is a cylindrical body surrounded by an inlet guide vane. WO 2007/049246 describes a separator tank, also of this kind, where the inner annular wall in the single separator tank unit is a cone-shaped body, and series or parallel connection of several separator tanks are described. WO 2007/049245 also describes a separator tank, where a central vortex-breaker is present in the single separator tank unit, and series or parallel connection of several separator tanks are described.

The separator tanks are used to remove small amounts of oil from a main flow of water. The main flow of water is typically a result of production of crude oil after the initial separation of oil from the fluid flow coming from the wellhead. The initial separation may take place in one or more stages, and the water flow separated off from the oil will contain small amounts of oil and gas, such as 100 mg oil per liter of water (100 ppm oil) or even less oil, such as 50 mg oil per liter of water (50 ppm oil). Although these amounts of oil may seem small, it is for environmental reasons an advantage if they may be further reduced before the water is discharged into a suitable recipient, such as the sea, or into a reservoir. In addition to purifying the water before it is discharged, the separator tanks provide the distinct advantage that the recovered oil can be utilized. And in this respect a rather high degree of purification can be advantageous also in cases where the water is to be re-injected into the oil field formation.

In order to obtain the desired low level of oil and gas in the discharged water it is required to treat the water in two or more subsequent purification steps, and for that several separator tanks are required. The separated volumes of water in relation to the volumes of produced oil become larger as the oil field ages, and at the same time the value of the oil production diminishes due to the lower amounts.

An object of the present invention is to simplify the equipment used for cleaning of water from the oil production, and in particular to increase the efficiency of the separator tank in relation to the area required for the installation.

With a view to this, the initially mentioned separator tank is characterized, according to the present invention, in that the separator tank comprises an inner annular enclosure that divides the separator tank into an annular outer area and a central area, that two or more separator tank units are arranged on top of one another within the central area separated by an intermediate bottom, and that the flow paths of fluids to inlets in the separator tank units and from at least one second outlet in the separator tank units are arranged at least in the annular outer area.

The arrangement of the separator tank units on top of one another within the inner enclosure has several advantages. The wall of the inner enclosure may as a single part function as outer wall of the individual separator tank units arranged in the central area within the inner enclosure. The annular outer area inside the separator tank and the arrangement of the flow paths between the individual separator tank units in this annular area result in the simplification that many of the required wall penetrations are in the inner enclosure, and not in the casing of the separator tank. The casing of the separator tank is a pressure-tested vessel, and this places higher demands on welds, requires larger sizing of the material, and testing of the construction. As the separator tank units are located on top one another the flow paths are at a minimum and a lot of piping is saved in comparison with the prior art arrangement of several individual separator tanks. The short flow paths also reduce the flow resistance, in particular for the flow of water.

Installation of the single separator tank according to the present invention is easier than the prior art installation of several tanks, because the work of building two or more of the separator tank units within the separator tank is performed on factory, and the separator tank is delivered to the installation site as a single unit. This ease of installation is in particular important at offshore oil fields where installation work is costly, and where work is influenced by weather conditions. Another important installation aspect is the smaller area required in comparison with the prior art installation of several separate separator tanks.

In an embodiment of the separator tank, a first inlet flow path connects an inlet on the separator tank with the inlet for fluid in a first of the at least two separator tank units; a second inlet flow path connects the second outlet in the first separator tank unit with the inlet for fluid in a second of the at least two separator tank units; and a first outlet flow path connects a water outlet on the separator tank with the second outlet of the second separator tank unit, when the separator tank has two separator tank units, or with the second outlet of the last separator tank unit, when the separator tank has more than two separator tank units. It is noted that the terms "a first inlet flow path", and "a second inlet flow path" are terms designating a first path and a second path for inlet flows, and the terms "a first outlet flow path", and "a second outlet flow path" are terms designating a first path and a second path for outlet flows. The separator tank units within the separator tank are thus connected in series, which allows for an efficient removal of oil and gas from the water. If a high capacity of the separator tank is more important, then two or more of the separator tank units within the separator tank may instead be connected via parallel flow paths to the inlet on the separator tank and via other parallel flow paths to the water outlet on the separator tank.

The flow paths of fluids in the annular outer area can be defined by internal walls mounted in the annular outer area. However, in a preferred embodiment the inlet flow paths are defined by pipes in the annular outer area. The pipes have the advantage that they may perform bends without any change in flow cross-sectional area and this ensures constant flow and the lowest possible risk of settlement of sand or other particles transported with the inflowing water. And in addition the pipes can be mounted onto the wall of the inner annular enclosure and thus avoid most of the mounting to the inside of the separator tank casing that is required when internal walls are used for defining the flow paths.

In one embodiment a second outlet flow path connects an outlet for oil and gas on the separator tank with the first outlet on at least one of the separator tank units. The oil and gas is thus conveyed directly from the separator tank unit(s) and out of the separator tank where the oil and gas may flow downstream to e.g. a reject tank.

In another embodiment a second outlet flow path connects the annular outer area in the separator tank with the first outlet on at least one of the separator tank units. The annular outer area is thus utilized as a tank for temporary holding the oil and gas and this allows the gas to occupy the upper area of the annular outer area and the oil to seek to the lower area of the annular outer area. One advantage of this embodiment is the very short flow paths from the first outlets of the separator tanks to the annular outer area, as the path need only extend out through the wall of the inner annular enclosure. Another advantage is the possibility to use gas collected in the upper area as re-cycled flotation gas injected in the inlet for fluid of one or more of the separator tank units.

Preferably, a first gas return path connects an outlet for gas at the separator tank with a gas injection means in the inlet for fluid in at least one of the at least two separator tank units. The separator tank operates at a rather low pressure, such as a pressure of less than 7 barg or even less than 4 barg, and as this pressure is typically much lower than the pressure in the oil field formation from which the water is retrieved, and lower than the pressure in the previous separation steps, dissolved gas will be freed from the water and will flotate in the separator tank. Anyhow, the efficiency in oil removal from the water may be increased by adding further gas to the water, and when gas freed in the separator tank is recycled to the inlet for fluid then that flow of gas need not be supplied from an external source.

It is possible to operate the separator tank with a single, common flow rate control valve, or to let the flow rate vary without control, but for the sake of optimized capacity of the separator tank and in order to obtain a relatively high amount of oil in the flow out of the first outlet, it is preferred that the individual separator tank unit has a flow rate control valve for controlling flow from the first outlet of the separator tank unit. Individual setting of the flow rate allows for individual adjustment of the ratio between oil and gas in the flow through the first outlet. A too high flow rate may cause outflow of too much gas, and possibly also water, and a consequent too small amount of oil in relation to gas in the outflow. A too low flow rate may cause a lowering of the liquid level in the separator tank unit and a consequent failing through-flow and a lower capacity of the separator tank unit.

In an embodiment a water outlet conduit from the water outlet on the separator tank has a pressure control valve for controlling the pressure at the water outlet on the separator tank to be higher than the pressure in the water outlet conduit downstream of the pressure control valve. An effect of this is that a generally suitable pressure is maintained within the separator tank, and more precisely in the separator tank units. An advantage of this embodiment is that only a single pressure control valve is required, controlling in common the pressure drop across all separator tank units in the separator tank. This is in particular an advantage when the separator tank units in the separator tank are coupled in parallel, but it can also be used when the separator tank units are coupled in series.

In an embodiment the individual separator tank unit has a pressure control valve for controlling the pressure at the second outlet of the tank unit to be higher than the pressure downstream of the pressure control valve. The individual control of the separator tank units allows for a more precise control of the separator tank operation, as the control of the pressure drop across the individual separator tank unit is more precise, and thus the control of the velocity of the inflowing fluid is better. This is in particular an advantage when the separator tank units in the separator tank are coupled in series, as it allows setting of mutually different pressure drops across the separator tank units.

A preferred embodiment has, downstream of the separator tank's outlet for oil and gas, a pressure control device for controlling the downstream pressure, preferably so that the pressure at the separator tank's outlet for oil and gas is lower than the pressure at the water outlet on the separator tank. When the separator tank is in operation, the liquid level within the individual separator tank unit is rising and lowering in a pulsating manner around the first outlet for oil and gas, and when the pressure at the separator tank's outlet for oil and gas is lower than the pressure at the water outlet, and preferably at least 0.2 bar lower, suitably about 0.4 bar lower, then the amplitude in the pulsating liquid level change is smaller, and as a result the amount of water flowing out together with the oil is reduced. When the pressure is controlled on the downstream side of the separator tank, such as by controlling the pressure in a downstream reject tank, the pressure is controlled for the separator tank as such at the separator tank's outlet for oil and gas and the individual separator tank units are subjected to an equal pressure level at their first outlets.

In another embodiment, the individual separator tank unit has a pressure control device for controlling the pressure downstream of the separator tank unit's first outlet, preferably so that the pressure be lower than the pressure at the separator tank unit's second outlet, and this embodiment allows individual setting of the pressure at the first outlet. When the separator tank units are coupled in series, the amount of oil to be removed is larger in the first separator tank unit than in the last separator tank unit, and consequently the pressure at the first outlet may be set to be the lowest at the last separator tank unit.

In an embodiment the individual separator tank unit has a central pipe extending from the first outlet in the upper part of the separator tank unit to the second outlet in the lower part of the separator tank unit, which central pipe is blocked with a flow barrier in between the first outlet and the second outlet, and which central pipe has an upper extension extending out of the separator tank unit and a lower extension extending out of the separator tank unit. The central pipe is thus utilized for both oil and gas flowing in through the first outlet, and for water flowing in through the second outlet, and the design is thus very compact with only few separate parts. In addition, the central pipe also acts as both a vortex breaker at the centre of the separator tank unit and as a support for the means for calming the flow around the second outlet, and possibly also as a support for the inner annular wall in the separator tank unit.

A further development of this embodiment is characterized in that in the lowermost separator tank unit in the separator tank the lower extension of the central pipe extends down through a bottom end of the separator tank, and that in the uppermost separator tank unit in the separator tank the upper extension of the central pipe extends up through a top end of the separator tank, whereas the remaining extensions of the central pipes extend in radial direction out of the separator tank units via bend portions. This embodiment reduces the flow resistance across the separator tank.

In a preferred embodiment the first of the at least two separator tank units is located uppermost within the inner annular enclosure of the separator tank, and the second of the at least two separator tank units is located adjacent and below the first separator tank unit. This design minimizes the length of the flow paths within the separator tank.

Figure 2:
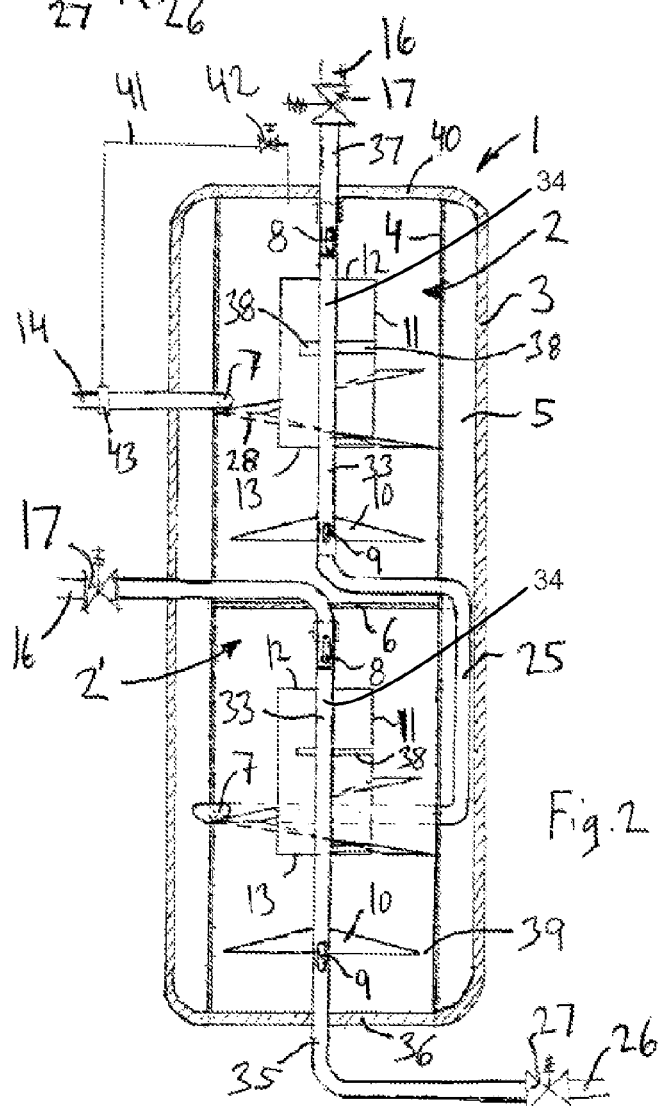
Figure 3:
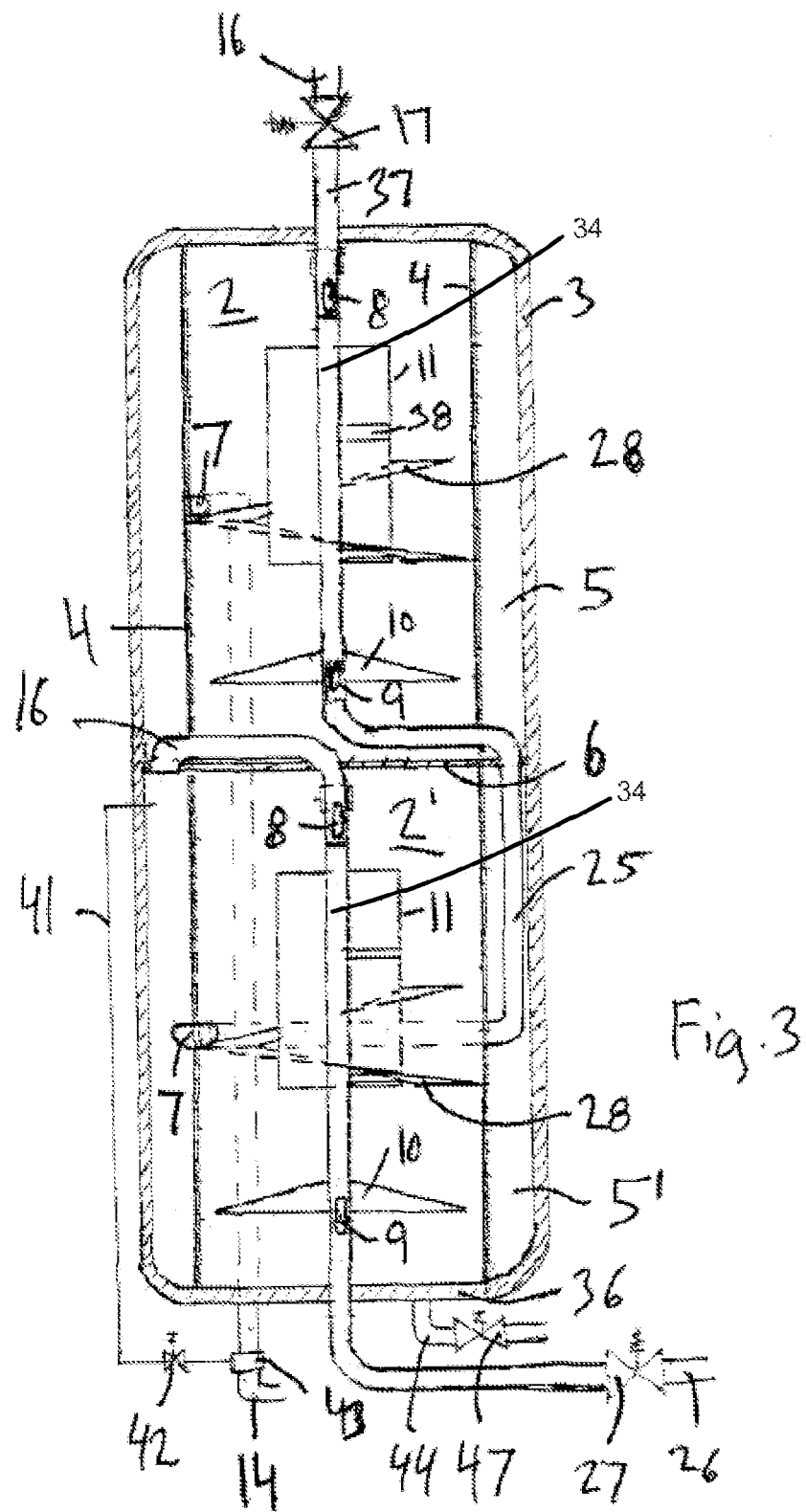
Figure 4:
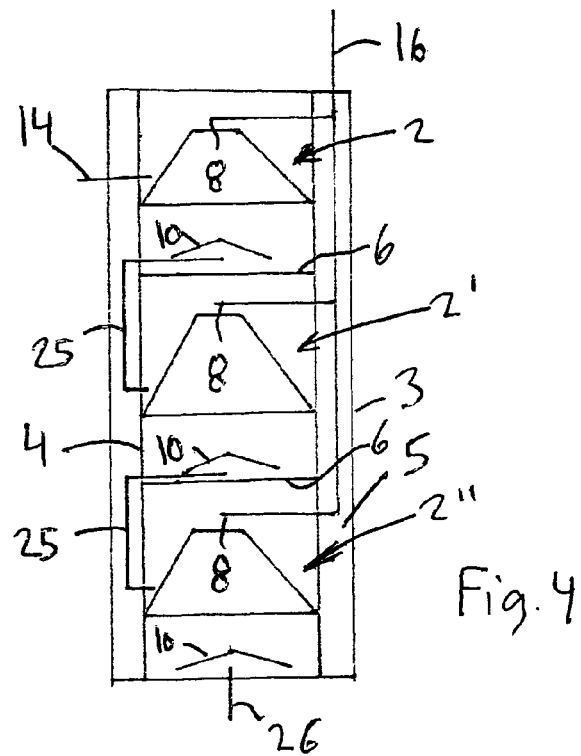
Figure 5:
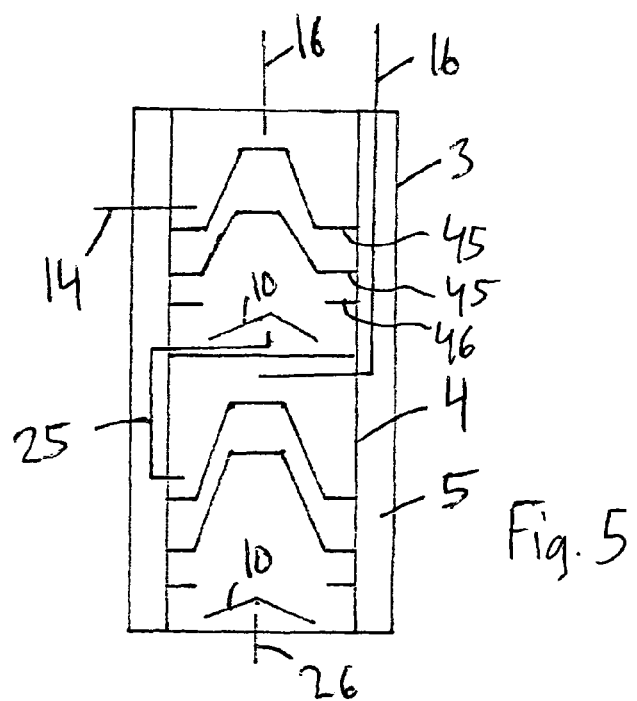
Figure 6A:
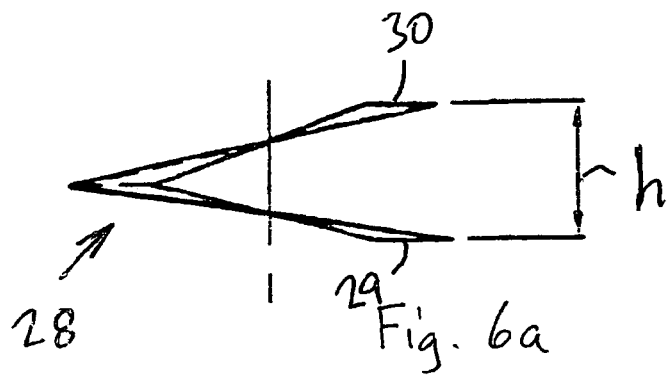
Figure 6B:
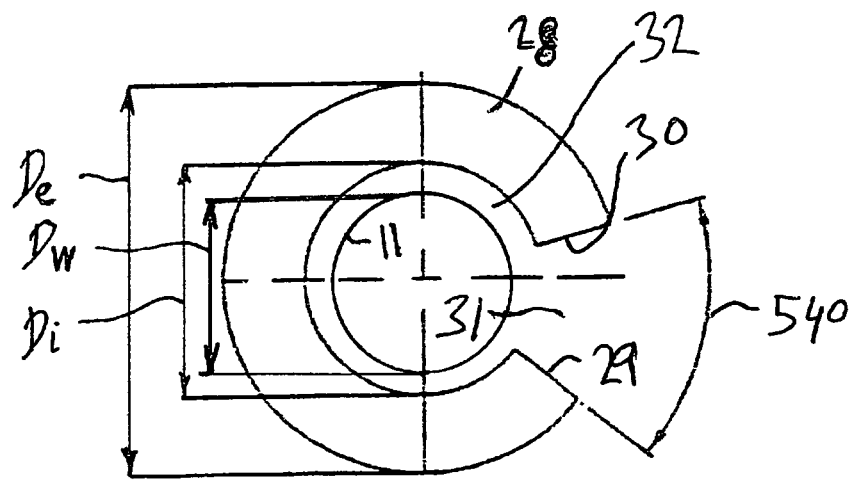

Examples of embodiments of the present invention are described in the following in more detail with reference to the illustrative and schematic drawings, in which FIG. 1 is an illustration of a separator tank according to the present invention and an associated reject tank, FIG. 2 is a longitudinal section through a first embodiment of the separator tank in FIG. 1, FIG. 3 is a longitudinal section through a second embodiment of the separator tank in FIG. 1, FIG. 4 is an illustration of a third embodiment of the separator tank in FIG. 1, FIG. 5 is an illustration of a fourth embodiment of the separator tank in FIG. 1, and FIGS. 6a and 6b are illustrations seen in side-view and from above of a vane from a separator tank unit in the first embodiment depicted in FIG. 2.

A separator tank, generally designated 1 in FIG. 1, is a multi-stage separator tank comprising two or more separator tank units 2, 2' arranged on top of one another. In the various embodiments described in the following the same reference numerals are used for details that are the same. The two separator tank units are connected in series, i.e. a second outlet 9 for water in separator tank unit 2 is connected with an inlet 7 for fluid in separator tank unit 2'. In this manner the water cleaned in separator tank unit 2 is cleaned even further in separator tank unit 2'. The separator tank can be installed at a production facility separate from the actual oil well such as at a location where processed water is purified prior, typically at a location above the water surface, such as on a platform or a rig, or at an on-shore location. When used at an oil production site, the separator tank is thus installed downstream of the Blow Out Preventer (BOP) located at the well head.

As illustrated in FIG. 2, the separator tank units 2, 2' are located within a vertical, cylindrical tank casing 3 that is dimensioned as a pressure vessel capable of fulfilling the pressure testing class relevant to the operating pressure within the tank. The interior of the casing is divided into two by an inner annular enclosure 4, which is a cylindrical wall of steel plate of smaller wall thickness than casing 3. A central area within inner annular enclosure 4 holds the separator tank units, and an annular outer area 5 between the outer surface of inner annular enclosure 4 and the inside surface of casing 3 holds flow paths for fluids conveyed into and out of the separator tank units 2, 2'.

An intermediate bottom 6 separates upper, first separator tank unit 2 from lower, second separator tank unit 2'. The separator tank units are preferably analogously designed within the separator tank, however it is also possible to have separator tank units of different designs within the same separator tank. The separator tank unit has in its interior an upper part and a lower part, which may also be called an upper portion and a lower portion, as according to the present invention upper part and lower part of the separator tank unit are to be taken to mean in the upper area of the separator tank unit and in the lower area of the separator tank unit. The separator tank unit has in its upper part the inlet 7 for fluid and a first outlet 8 and has in its lower part the second outlet 9 and a means 10 for calming the stream around the second outlet. The separator tank unit furthermore has an inner annular wall 11 which divides the flow in the upper part of the separator tank unit into an outer vortex flow taking place outside the inner annular wall and an inner flow in a central area inside the inner annular wall.

The inner annular wall has at its upper end a first opening 12 and at its lower end a second opening 13, and this first opening 12 and second opening 13 allow fluid flow communication between the upper part and the lower part of the separator tank unit 2, 2', the lower part being located from the second opening 13 and downwards. The outer vortex flow takes place in the annular space between the inner annular wall and the inner annular enclosure 4, and near the inner annular wall the flow of water is in addition to the rotating movement also moving downwards. At the lower edge of the inner annular wall the innermost part of the flow may flow around the edge and up through the second opening 13. This upward flow may include gas bubbles.

Inlet 7 for fluid in the first separator tank unit 2 in FIG. 1 is tangentially directed so that it ejects an inlet flow in a horizontal direction along the inside of the inner annular enclosure with the effect that the inlet flow acts to rotate the fluid within the separator tank unit in a vortex flow. The rotational movement causes the lighter constituents such as oil drops and gas bubbles to be forced towards the centre of the tank. Due to the rotation and to gravitational effects oil and gas in the fluid tend to concentrate at the radial inner portion of the fluid flow, where oil and gas have a tendency to move in the upward direction, against a downward movement of the water. The inner annular wall assists the upward movement of oil and gas in several manners. When the fluid flow meets the inner annular wall oil and gas bubbles will coalesce and become larger and thus obtain an increased tendency to rise due to lower density than the surrounding water. And as described in the above, the lower edge of the inner annular wall allows in particular smaller gas bubbles and oil to flow around the edge and rise in the central portion after having been dragged downward by the water flow. The oil and gas collect at and above the upper surface of the fluid flow.

The tangential inlet flow may be obtained in several different manners. One possibility is to mount the inlet pipe so that it extends in tangential direction at the entry into the separator tank unit. Another possibility is to place a baffle plate at the inlet, so that the inlet flow is directed into the tangential direction irrespective of how the inlet pipe extends in vicinity of the inlet opening. The inlet pipe may e.g. extend in the radial direction into the separator tank unit and have a baffle plate mounted in front of the opening. In the first embodiment of FIG. 2 an inlet pipe 14 extends in radial direction through casing 3 and ends in a bent portion passing through the inner annular enclosure so that the inlet 7 for fluid is facing in the tangential direction, thereby providing the rotational movement of the water in the tank 1.

The first outlets 8 in the separator tank units of FIG. 1 are connected to a reject tank 15 via outlet pipes 16. Each outlet 8 is associated with a flow rate control valve 17. If this valve is closed during operation, the associated separator tank unit will empty itself of water and be filled with gas. If valve 17 is fully opened during operation the flow rate through the first outlet will be large and the water content in the flow will be too high. Valve 17 is preferably set individually for the separator tank units, and preferably so that the valve 17 associated with the first separator tank unit 2 is more open than the valve 17 associated with the second separator tank unit 2'.

Oil, gas and water in the reject tank 15 are once again allowed to separate, however here the oil content is high, especially in case the valves 17 are set with precision minimizing the water content and the operating conditions are stable. Oil is retracted via oil line 18 having a pressure control device in form of a pressure control valve 19, which is used to control the pressure in the reject tank and thus also the pressure at the first outlets 8. Alternatively, the pressure control device may be a pressure control valve in outlet pipe 16, and such a single valve may be present in the common branch of outlet pipe 16, or alternatively the individual branch of outlet pipe 16 may have a pressure control valve. A gas line 20 with a pump 21 may re-circulate gas from the reject tank to inlet pipe 14. The pump 21 increases the gas pressure to be higher than the pressure in the inlet pipe. A water line 22 with a regulating valve 23 and a pump 24 for increasing the pressure in the water may connect a water outlet on the reject tank with inlet pipe 14, or the water line may simply be connected to a drain.

The second outlet 9 in the first separator tank unit 2 is connected with the inlet 7 for fluid in the second separator tank unit 2' via an intermediate pipe 25. Gas branch line 20' may supply gas to the water in the intermediate pipe. Second outlet 9 in the second separator tank unit 2' is connected to a water outlet conduit 26 with a pressure control valve 27. The pressure control valve controls the pressure drop across the separator tank. In the example illustrated in FIG. 1 the pressure drops are large. The pressure in inlet pipe 14 is 3.0 barg, and valve 27 is set so that the pressure drop from inlet pipe 14 to outlet conduit 26 is 1.6 bar, and the pressure in the first separator tank unit 2 is considered to be about 2.2 barg and the pressure in the second separator tank unit is 1.4 barg. The pressure at the second outlet of the tank unit is about the same as the pressure in the tank unit. Pressure control valve 19 is set so that the pressure in the reject tank is about 1.0 barg. In the typical case, the pressure drop from inlet pipe 14 to outlet conduit 26 is about half the mentioned value, namely about 0.8 bar, the feed pressure in inlet pipe 14 is about 1.8 barg, the pressure in the first separator tank unit 2 is about 1.3 barg and the pressure in the second separator tank unit is about 0.9 barg. Pressure control valve 19 is then set so that the pressure in the reject tank is about 0.5 barg. It is an advantage to use as low pressure as possible, because the gas in the water will evaporate to a larger extent, when the pressure is lower. This will on the one hand provide gas bubbles for use in the separator tank, and on the other hand the water is cleaned of the gas content and is thus better purified.

The separator tank 1 and the reject tank 15 together form a cleaning system where an incoming flow of unclean water in form of a fluid mixture with a content of water of at least 96% and a content of oil and gas of at the most 4% in total is supplied at inlet pipe 14. At the water outlet conduit 26, almost clean water is delivered, preferably water with less than 0.001% oil and gas content. At oil line 18 the recovered oil is delivered in a state fit for addition to the oil production line.

In the following various examples of actual embodiments for the separator tank unit are described in further detail. It is naturally possible to modify the embodiments within the contents of the appended patent claims, and details of the different embodiments may also be combined into other embodiments within the contents of the patent claims.

In the first embodiment of FIG. 2 a helical vane 28 is located at the inlet for fluid so that the vane is just below the inlet opening and extends upwards on the inside of the inner annular enclosure 4 in the flow direction of the incoming fluid, so that the incoming fluid is forced to flow in a slightly upwards directed swirling fluid motion. Viewed in the direction of the vortex rotation, the helical vane is positioned with a portion of its length extending before—or upstream of—the inlet for fluid. In other words, the helical guide vane extends to both sides of the inlet for fluid. The length of the helical vane is from an upstream end 29 to a downstream end 30. The portion of the length located before the inlet is preferably in the range from 25% to 50% of the total length, and suitably about 30 to 35% of the total length of the helical vane. This portion of the helical vane functions to catch some of the downward water flow and direct it upwards so that the water obtains a longer residence time in the tank with an improved possibility for gas and oil rising to the upper surface of the flow.

Helical vane 28 is illustrated in more detail in FIGS. 6a and 6b. The helical vane may extend in the range from 180° to 450° around the inside circumference of the inner annular enclosure 4. Preferably, the helical vane extends less than 360°, such as in the range from 290° to 320° around the inside circumference. In the illustrated embodiment the helical vane extends through 306°. This leaves an open sector 31, e.g. the angular sector of 54°, between ends 29 and 30, and in this open sector the water is free to flow downwards. The vane is going helically upwards in the downstream direction so that downstream end 30 is located at a higher level than upstream end 29, and this difference in height h is illustrated in FIG. 6a and may have a value in the range of e.g. 20-50%, preferably from 30-40%, and suitably about 35% of the inner diameter of inner annular wall 11. When the slightly upward rotating flow of water passes downstream end 30, the flow is no longer guided upwards by the helical vane and will turn in downward direction in the open sector. However, the rotating movement in the flow continues, and as the flow turns downward it also moves in direction of upstream end 29 where part of the flow will be forced to flow on the upper side of the helical vane and thus again be moved upward in the separator tank unit.

Inner annular wall 11 extends from about the level of the upstream end 29 of the helical vane and has preferably a height of about twice the extension in height h of the helical vane. Inner annular wall 11 is cylindrical and its outer diameter is smaller than the inner diameter Di of the helical vane so that the inner annular wall 11 is surrounded by an annular free space 32 through which the water is free to flow downwards. The velocity in the downward flow of water is influencing the flotation, as the gas bubbles and oil, in order to surface in the upper part of the unit, need to have a larger velocity upwards relative to the water than the downward velocity of the water. Therefore, the helical vane has an inner diameter Di larger than the outer diameter Dw of inner annular wall 11, and preferably Di is in the range from 1.2 to 1.6 Dw, and more preferably Di is in the range from 1.3 to 1.45 Dw.

The inner annular enclosure 4 has an inner diameter De, and the ratio De/Di between De and the inner diameter Di of helical vane 28 is e.g. in the range from 1.5 to 2, preferably from 1.60 to 1.90. The most preferred ratio is about 1.78. The ratio Dw/De between the outer diameter Dw of inner annular wall 11 and De the inner diameter of inner annular enclosure 4 is between 2.35 and 2.85, preferably from 2.40 to 2.70, and most preferably about 2.66.

There are rather wide limits for the ratio H/D between the height and the diameter of the individual separator tank unit 2, such as in the range from 1 to 4, but preferably this ratio H/D is at least 1.30, such as in the range from 1.3 to 2.5, and more preferably in the range from 1.3 to 1.8.

The tangential inlet in combination with the annular wall of the tank and the helical vane provides for a formation of a vortex flow in the upper part of the tank and of a vortex flow in the lower part of the tank. It is preferred that the vortex flow does not form a vortex eye in the centre of the tank which eye is free of liquid mixture. The formation of a vortex eye is undesired because it decreases the capacity of the unit. In order to avoid the formation of a vortex eye a rod-shaped, vertically extending vortex eye breaker can be mounted along the centre line of the separator tank unit. This is in principle known from WO 2007/049245. According to the present invention and the embodiments illustrated in FIGS. 2 and 3 the pipes leading to the first outlet 8 and the second outlet 9 are interconnected via a length of a central pipe 33. A flow barrier 34 is mounted inside the pipe, preferably at a position just below first outlet 8, and it separates the interior volume of the pipe in two parts and prevents fluid flow from one part to the other and allows the one part to be at another pressure than the other part. The outlets are shaped as openings in the side of the pipe, and cleaned water flows out via second outlet 9 and gas and oil flows out via first outlet 8.

The second outlet 9 is positioned in the lower part of the separator tank unit and the oil outlet is positioned in the upper part of the separator tank unit. In the second separator tank unit 2' (lowermost unit in the embodiment of FIG. 2) a lower extension 35 of the central pipe 33 extends down through a bottom end 36 of separator tank 1. In the first separator tank unit 2 an upper extension 37 of the central pipe extends up through a top end 40 of the separator tank. At the intermediate bottom 6 the central pipe 33 in the second separator tank unit 2' has a 90° bend portion and continues in radial direction out of the separator tank unit to flow rate control valve 17. At the intermediate bottom 6 the central pipe 33 in the first separator tank unit 2 has also a 90° bend portion and continues in radial direction out of the separator tank unit to intermediate pipe 25. Central pipe 33 also serves as support for inner annular wall 11 which is mounted to the central pipe via three radially extending struts 38, or via two sets of three struts mounted e.g. at the upper end and at the lower end of inner annular wall 11. A means 10 for calming the flow around second outlet 9 can be cone-shaped (a Chinese hat) and welded onto central pipe 33. The volume within unit 2 or 2' in the area above the cone-shaped means 10 is in flow connection with the area below the cone-shaped means 10 only through an annular space 39 between outer rim of the cone-shaped means 10 and the inside surface of inner annular enclosure 4. The downward flow of water thus has to pass this annular space in order to flow to second outlet 9. The vortex flow in the lower part of the unit is thus calmed, made more uniform, or significantly dampened, before the water exits through second outlet 9.

The pressure in the tank $P_t$ is maintained higher than the pressure Po in outlet pipe 16, that conveys the reject oil, gas, and if unavoidable also water. Preferably, the pressure difference Pt-Po is about 0.4 bar. The pressure Pt in the tank should preferably be higher than the pressure Pw in the water outlet conduit downstream of pressure control valve 27, i.e. Pt>Pw, and suitably Pt is maintained at about 0.5 bar higher pressure than Pw. As mentioned in the above the pressure differences can in an embodiment be controlled by pressure control valves associated with the separator tank, but it may alternatively be devices in the process systems upstream and downstream of the separator tank that set the pressures. This, however, makes the correct functioning of the separator tank very dependent on other systems.

The first outlet 8 in the upper part of the separator tank unit is located at a distance from the top of the separator tank unit. This allows gas to build up in the uppermost portion of the unit. When gas has filled the volume above first outlet 8 and the gas level reaches down to the first outlet, then the gas flows into the first opening and out through outlet pipe 16. The gas collected in the uppermost portion is much more compressible than the liquid/gas fluids present in the lower portions of the unit, and the collected gas may thus act as a cushion absorbing instant pressure variations in inlets and outlets to the separator tank unit. A certain volume of gas is required in order to achieve this effect during normal operation, and it is consequently preferred that the outlet opening is located in the range from 7 to 20% of the diameter De of the inner annular enclosure 4 below the upper end of the separator tank unit, and more preferably in the range from 10 to 15% of this diameter De. The gas comes from the mixture of water, oil and gas flowing into the unit via inlet pipe 14. Within the vortex flow in the unit the gas acts to collect oil and via coalescence the size of the gas bubbles increase and enables the bubbles to obtain such a large size that they are capable of rising up through the water flow and flotate in the uppermost area of the unit. Due to the overall conditions within the separator tank unit the liquid level in the unit has a tendency to fluctuate up and down as the pressure level in the gas decreases and increases. As the oil concentrates at the surface of the liquid, the fluctuations are preferably so small that mainly oil flows out through the first outlet 8.

At ordinary operation gas build up takes place by accumulating gas until the gas has displaced the liquid part of the mixture in the tank to a level just below the first outlet. At this point gas and oil will be ejected through the second outlet and leave the separator tank unit. The level of the liquid mixture will rise to above the outlet for oil and gas and a new sequence of gas build up will take place. In this manner oil is automatically skimmed from the top of the water in the separator tank unit. In ordinary operation about 0.2%-3% of the fluids flowing into the unit via the inlet for fluid are flowing out via the first outlet.

In a preferred embodiment additional gas is injected into the fluid flowing in the inlet pipe 14. Although the water will typically have an amount of gas coming from the reservoir from which the water has been withdraw, it is an advantage to supply additional gas that can be mixed with the fluid thereby increasing the ability of capturing oil particles within the fluid mixture. The gas used for gas injection may be any gas suitable for forming bubbles in the fluid, e.g. $CO_2$, nitrogen or a gas based on hydrocarbons. Preferably, the gas is recycled from the processes utilized for separating oil and gas from water. Such recycling may take place from the individual separator tank unit by providing a gas recycling conduit 41 leading from the uppermost portion of the volume within the unit to inlet pipe 14. The inlet pipe has a device 43 for adding gas. If the device is of an ejector type it is on its own capable to draw gas from the unit, and then only a flow rate control valve 42 is needed in the conduit 41. Alternatively, a pump for increasing the gas pressure may be utilized in conduit 41, and then the gas may be injected through nozzle openings into the fluid flow in inlet pipe 14.

The amount of gas added is typically in the range of 0.02 to 0.2 St·m$^3$ per 1 m$^3$ of fluid. Values in the range of 0.05 to 0.18 St·m$^3$ per 1 m$^3$ of fluid are preferred, but higher values for the amount of gas added can also be used, such as an amount of up to 0.3 St·m$^3$ per 1 m$^3$ of fluid. St·m$^3$ is standard cubic meters of the gaseous medium. St·m$^3$ is standardised within the offshore field (volume of dry gas at 15.6° C. and at a pressure of 101.325 kPa).

The dimensions of the separator tank unit are typically selected according to the amounts of water intended to be treated. In test operation is has been found that the residence time in the separator tank unit could preferably be selected to be from 5 to 60 seconds, preferably 5 to 40 seconds, and more preferred from 8 to 35 seconds. When the residence time is set, and the desired capacity is known, the required efficient flotation volume can be calculated, and the calculation can be based on the assumption that a separator tank unit with an efficient flotation volume of 1 m$^3$ and a residence time for the liquid of 30 seconds has a capacity of 120 m$^3$ per hour. If the residence time is lowered then the capacity is proportionally increased, or the volume is proportionally decreased. If the capacity in increased and the residence time maintained then the volume has to be increased proportionally.

The gas is preferably dispersed in the fluid as tiny bubbles, such as by being injected into the fluid in the inlet duct via a nozzle device 43 located only a short distance from the inlet opening in order to avoid the tiny gas bubbles merging to form bigger gas bubbles before entry into the separator tank unit. The gas injection is preferably performed in the inlet pipe 14 no more than from 5 to 40 cm from the inlet for fluid 7. The nozzle or nozzles for injection may in this case be located in a ring and the inlet pipe may have a flow restriction that causes turbulence in the flow within the pipe in order to improve the mixing of gas with the fluid.

The tank casing 3 with its bottom end and top end are made in accordance with at least ANSI 150 psi, and are as such approved for operating with a maximum pressure of between 17-20 bar, though typically the operation pressure is only between 1-3 barg.

When the separator tank units are connected in series, as illustrated in FIGS. 2 and 3, the first separator tank unit 2 receives a mixture of water, oil and gas having e.g. 800 ppm of impurities in the form of oil and gas, and at the outlet 9 from the first unit 2 the water has been cleaned to a content of impurities of about 90 ppm. The second separator tank unit can then further clean the water delivered from the first separator tank unit to a content of impurities of about 9 ppm. These values are examples only, and many other values may be obtained, however, the flow of water becomes cleaner when it is treated in more stages. And the multi-stage separator tank with the individual unit mounted above one another is a water cleaning solution that is very effective and occupies only a small area.

The second embodiment of FIG. 3 is in most details like the first embodiment in FIG. 2, and only differences shall be described below, as reference is made to the above description for all other details. The separator tank in the second embodiment is designed with the view that most connections to the separator tank should be made at the bottom of the tank so that the tank with its surrounding details occupy as small an area as possible (a very small footprint in relation to capacity). The annular outer area 5 provides space for the flow paths required, and the inlet pipe 14 is thus entering the annular outer area 5 from below via the bottom end 36 of the tank and runs vertically up within annular outer area 5 and performs a bend at level with the inlet for fluid where it passes through inner annular enclosure 4 and debouches in the inlet for fluid 7 that directs the incoming fluid in the tangential direction.

The outlet pipe 16 from the first outlet 8 in the second separator tank unit 2' has a 90° downward bend in the annular outer area 5 and passes down through intermediate bottom 6. Intermediate bottom 6 has been extended in the horizontal direction to pass through inner annular enclosure 4 and to be welded onto the inside of the cylindrical tank casing 3, so that the volume within the latter and thus also the annular outer area 5 are divided into separate sections corresponding to the extension in height of the separator tank units 2, 2'. The lower annular outer area 5' is thus a container or tank volume in itself. The outlet pipe 16 from the second separator tank unit 2' it thus delivering the outflow of oil, gas and possible water into the volume of the lower annular outer area 5', wherein the gas is allowed a rather long time to separate from the oil, because the flow rate of oil is small. The gas can be recirculated through gas recycling conduit 41, and the oil can be taken out from the lower annular outer area 5' via an oil reject line 44 with a flow control valve 47. It is naturally possible also to let the upper extension 37 perform a bend within tank casing 3 and exit through inner annular enclosure 4 into the annular outer area 5 and there either debouch into the annular outer area outside the first unit or perform a further bend and extend down through intermediate bottom to debouch into the lower annular outer area 5'.

The separator tank unit can also be designed in other manners within the scope of the appended patent claims. One example of this is illustrated in FIG. 4 where the separator tank is embodied with three separation steps, namely the first separator tank unit 2, the second separator tank unit 2', and a third separator tank unit 2". The interior in the individual separator tank unit is of a design different from that described with respect to the first and the second embodiment. With respect to conduits, pipes, connections, valves, intermediate bottoms annular outer areas, inlets, outlets, means for calming streams, inner annular enclosure etc. reference is made to the above descriptions of the first and second embodiments and the functioning thereof. However, with respect to the inner annular wall a completely different design is utilized, namely a design where the inner annular wall is cone shaped with a larger opening at the lower end and a smaller opening at the upper end, as described in WO 2007/049246.

It is also, as a further alternative, possible to design the inner annular wall in the separator tank unit with a downward facing cone as disclosed in WO 2007/049247, or the inner annular wall may be designed as a double-annular wall of cone-shape as illustrated in FIG. 5, where a flange area 45 in both cones is provided with an exit opening for downward flow, and a lower annular flange 46 is positioned under the exit opening in the flange area of the lower cone.

Furthermore, inner annular enclosure 4 need not be closed at the top and at the bottom by the ends of the tank casing. Instead a plate, like intermediate bottom 6, can be provided at either end of the inner annular enclosure, which may then terminate free of the tank casing so that pipes or flow paths can also extend into a free space between the ends of the inner annular enclosure and the tank casing. The inner annular enclosure can then be fixed to the cylindrical portion of the tank casing or be supported by legs or fixtures raised from the bottom end of the tank casing.

In the embodiments of. FIGS. 2 and 3, upstream end 29 of helical vane is located at a level a short distance above the second opening 13. Alternatively, the inner annular wall 11 can extend further down relative to upstream end 29 which would then be at a correspondingly increased distance above the second opening, or the upstream end can be located at a level a short distance below the second opening 13.

As an alternative to pipes the flow paths for inlet or outlet of fluids to the separator tank units, plate walls can extend between the outside of inner annular enclosure 4 and the inside of tank casing 3 and define the flow paths. Thus, a first inlet flow path connecting an inlet on the separator tank with the inlet 7 for fluid can be defined by such plate walls instead of the pipe section extending from inlet pipe 14 at the casing to inlet 7 for fluid in the embodiment of FIG. 2; a second inlet flow path connecting the second outlet 9 in the first tank unit 2 with the inlet 7 for fluid in the second tank unit 2' can be defined by such plate walls instead of the intermediate pipe 25 in the embodiment of FIG. 2; a first outlet flow path connecting a water outlet on the separator tank with the second outlet 9 in second tank unit 2' can be defined by such plate walls instead of the lower extension pipe 35 in the embodiment of FIG. 2; and a second outlet flow path connecting first outlet 8 with and oil and gas outlet on the separator tank can be defined by such plate walls instead of the upper extension pipe 37 in the embodiment of FIG. 2. This applies when there are two separator tank units. If the separator tank has e.g. three tank units, then the mentioned first outlet flow path connects the water outlet with the second outlet of the last (third) tank unit, and a flow path like the second inlet flow path connects the second outlet of the second tank unit with the inlet for fluid in the last tank unit.

Additives such as flocculants may also be added to the water before entering into the separator tank unit in order to improve the cleaning efficiency.

The first outlet opening 8 in the upper part of the separator tank unit need not be a lower end opening in an outlet pipe extending upwards, but can instead be an upper end opening in an outlet pipe extending downwards and out of the tank unit at a lower level, or an opening in an outlet pipe extending radial or sideways out of the tank unit.

An example of an embodiment is described in the following.

EXAMPLE

In the illustrated embodiment the inner annular enclosure has a diameter of De=265 mm, the helical vane has an inner diameter of Di=157 mm, the inner annular wall 11 has a diameter of Dw=114 mm. The separator tank has two equally designed separator tank units of these dimensions and an individual height of 500 mm, and the separator tank units are mounted one above the other with an intermediate pipe 25 connecting the second outlet of the first unit with the inlet for fluid to the second unit. The inlet for fluid was positioned in the middle of the separator tank unit. The height of inner annular wall 11 was 205 mm high and the lower opening 13 was on level with upstream end 29 on the helical vane. The oil concentration in the water at the inlet for fluid was from about 1050 mg/l to 1150 mg/l. After some hours of running in the operation parameters obtained rather stable values with an oil content of the water in the water outlet conduit 26 of about 2 mg/l.

Variations in the described embodiments are possible within the scope of the appended claims, and details of the embodiments may be combined into new embodiments. In particular the inner annular wall may have other designs.

The invention claimed is:

1. A separator tank for separating oil and gas from water, and comprising an essentially cylindrical vertical tank casing and at least two separator tank units, which separator tank unit has an upper part and a lower part, an inlet for fluid, an inner annular wall, at least one first outlet in the upper part of the separator tank unit, at least one second outlet in the lower part of the separator tank unit, and a central pipe extending from the first outlet to the second outlet, the central pipe being blocked with a flow barrier between the first outlet and the second outlet, wherein the central pipe has an upper extension extending out of the separator tank unit and a lower extension extending out of the separator tank unit; said inner annular wall having a first opening at an upper end of said inner annular wall allowing communication between the upper part and the lower part of the separator tank unit, wherein the separator tank comprises an inner annular enclosure that divides the separator tank into an annular outer area and a central area, wherein said at least two separator tank units are arranged on top of one another within the central area separated by an intermediate bottom, wherein the flow paths of fluids to inlets in the separator tank units and from at least one second outlet in the separator tank units are arranged at least in the annular outer area, wherein an inlet on the separator tank is connected with the inlet for fluid in a first of the at least two separator tank units via a first inlet flow path, and the second outlet in the first separator tank unit is connected with the inlet for fluid in a second of the at least two separator tank units via a second inlet flow path.

2. The separator tank according to claim 1, wherein a water outlet on the separator tank is connected with the second outlet of the last separator tank unit via a first outlet flow path, said last separator tank unit being the second separator tank unit when the separator tank has two separator tank units.

3. The separator tank according to claim 1, wherein pipes define the inlet flow paths in the annular outer area.

4. The separator tank according to claim 1, wherein an outlet for oil and gas on the separator tank is connected with the first outlet on at least one of the separator tank units via a second outlet flow path.

5. The separator tank according to claim 1, wherein the annular outer area in the separator tank is connected with the first outlet on at least one of the separator tank units via a second outlet flow path.

6. The separator tank according to claim 5, wherein an outlet for oil and gas on the separator tank is in flow connection with the annular outer area in the separator tank.

7. The separator tank according to claim 6, wherein via a first gas return path an outlet for gas at the separator tank is connected with a gas injection means in the inlet for fluid in at least one of the at least two separator tank units.

8. The separator tank according to claim 1, wherein the individual separator tank unit has a flow rate control valve controlling flow from the first outlet of the separator tank unit.

9. The separator tank according to claim 2, wherein a water outlet conduit from the water outlet on the separator tank has a pressure control valve controlling the pressure at the water outlet on the separator tank.

10. The separator tank according to claim 9, wherein the pressure control valve is set to higher pressure at said water outlet than the pressure in the water outlet conduit downstream of the pressure control valve.

11. The separator tank according to claim 1, wherein the individual separator tank unit has a pressure control valve controlling the pressure at the second outlet of the tank unit to be higher than the pressure downstream of the pressure control valve.

12. The separator tank according to claim 1, wherein downstream of the separator tank's outlet for oil and gas there is a pressure control device controlling the downstream pressure.

13. The separator tank according to claim 12, wherein by the pressure control device the pressure at the separator tank's outlet for oil and gas is lower than the pressure at the water outlet on the separator tank.

14. The separator tank according to claim 1, wherein the individual separator tank unit has a pressure control device controlling the pressure downstream of the separator tank unit's first outlet to lower pressure than the pressure at the separator tank unit's second outlet.

15. The separator tank according to claim 1, wherein in the lowermost separator tank unit in the separator tank the lower extension of the central pipe extends down through a bottom end of the separator tank, and in the uppermost separator tank unit in the separator tank the upper extension of the central pipe extends up through a top end of the separator tank, whereas the remaining extensions of the central pipes extend in radial direction out of the separator tank units via bend portions.

16. The separator tank according to claim 1, wherein the first of the at least two separator tank units is located uppermost within the inner annular enclosure of the separator tank, and the second of the at least two separator tank units is located adjacent and below the first separator tank unit.

17. The separator tank according to claim 1, wherein the tank casing is dimensioned as a pressure vessel with larger wall thickness than the inner annular enclosure.

18. The separator tank according to claim 1, wherein the individual separator tank unit has a helical vane extending along the inside of the inner annular enclosure through a circumferential sector in the range from 290° to 320°.

19. The separator tank according to claim 18, wherein a ratio De/Di is in the range from 1.5 to 2, De being the inner diameter of the inner annular enclosure, and Di being the inner diameter of the helical vane.

20. The separator tank according to claim 1, wherein the individual separator tank unit has a ratio De/Dw in the range from 2.35 and 2.85, Dw being the outer diameter of inner annular wall, and De being the inner diameter of the inner annular enclosure.

21. The separator tank according to claim 1, wherein the separator tank is installed downstream of a Blow Out Preventer (BOP) located at a well head.

22. A separator tank for separating oil and gas from water, and comprising an essentially cylindrical vertical tank casing with a separator tank unit, which separator tank unit has an upper part and a lower part, an inlet for fluid, an inner annular wall, at least one first outlet in the upper part of the separator tank unit, at least one second outlet in the lower part of the separator tank unit, and a central pipe extending from the first outlet to the second outlet, the central pipe being blocked with a flow barrier between the first outlet and the second outlet, wherein the central pipe has an upper extension extending out of the separator tank unit and a lower extension extending out of the separator tank unit; said inner annular wall having a first opening at an upper end of said inner annular wall allowing communication between the upper part and the lower part of the separator tank unit, wherein the separator tank comprises an inner annular enclosure that divides the separator tank into an annular outer area and a central area, wherein two or more separator tank units are arranged on top of one another within the central area separated by an intermediate bottom, wherein the flow paths of fluids to inlets in the separator tank units and from at least one second outlet in the separator tank units are arranged at least in the annular outer area, and wherein the tank casing is dimensioned as a pressure vessel with larger wall thickness than the inner annular enclosure.

23. The separator tank according to claim 22, wherein the individual separator tank unit has a pressure control device controlling the pressure downstream of the separator tank unit's first outlet.

24. A separator tank for separating oil and gas from water, and comprising an essentially cylindrical vertical tank casing with a separator tank unit, which separator tank unit has an upper part and a lower part, an inlet for fluid, an inner annular wall, at least one first outlet in the upper part of the separator tank unit, at least one second outlet in the lower part of the separator tank unit, and a central pipe extending from the first outlet to the second outlet, the central pipe being blocked with a flow barrier between the first outlet and the second outlet, wherein the central pipe has an upper extension extending out of the separator tank unit and a lower extension extending out of the separator tank unit; said inner annular wall having a first opening at an upper end of said inner annular wall allowing communication between the upper part and the lower part of the separator tank unit, wherein the separator tank comprises an inner annular enclosure that divides the separator tank into an annular outer area and a central area, wherein two or more separator tank units are arranged on top of one another within the central area separated by an intermediate bottom, wherein the flow paths of fluids to inlets in the separator tank units and from at least one second outlet in the separator tank units are arranged at least in the annular outer area, and wherein the individual separator tank unit has a ratio De/Dw in the range from 2.35 and 2.85, Dw being the outer diameter of inner annular wall, and De being the inner diameter of the inner annular enclosure.

\* \* \* \* \*